United States Patent [19]

Hann et al.

[11] Patent Number: 4,714,166
[45] Date of Patent: Dec. 22, 1987

[54] SUPPORTING RACK FOR COOKING UTENSILS

[75] Inventors: William L. Hann, Bryan; Stanley E. Fuller, Toledo, both of Ohio

[73] Assignee: Commercial Aluminum Cookware Company, Perrysburg, Ohio

[21] Appl. No.: 861,932

[22] Filed: May 12, 1986

Related U.S. Application Data

[63] Continuation of Ser. No. 719,546, Apr. 3, 1985, abandoned.

[51] Int. Cl.⁴ .............................................. A47F 5/08
[52] U.S. Cl. .................................... 211/113; 211/94; 211/162; 248/215; 248/304; 248/307
[58] Field of Search .................. 211/113, 105.1, 105.2, 211/94, 162, 87; 248/215, 340, 304, 225.2, 227, 231.8, 307

[56] References Cited

U.S. PATENT DOCUMENTS

| | | | |
|---|---|---|---|
| 643,818 | 2/1900 | Headland | 211/113 |
| 1,786,038 | 12/1930 | Swanson | 248/307 |
| 2,643,775 | 6/1953 | Franklin | 211/87 |
| 3,235,095 | 2/1966 | Neill | 211/113 |
| 3,998,332 | 12/1976 | Lambertson | 248/215 |

Primary Examiner—Ramon S. Britts
Assistant Examiner—Blair M. Johnson
Attorney, Agent, or Firm—Allen D. Gutchess, Jr.

[57] ABSTRACT

A supporting rack for suspending heavy cooking utensils is provided. The supporting rack basically includes a bar of predetermined width and length with suspending members including hooks assembled in the bar. The basic bar has outwardly-extending flanges at the ends with the flanges having fastener-receiving openings therein. The bar also has notches in a lower longitudinal edge thereof near each of the ends. The suspending member has a web with end lips extending outwardly and back toward one another to fit over the longitudinal edges of the bar. A shank is connected to one of the lips and a hook extends from the shank for suspending a utensil. The web and lips of the suspending member are dimensioned such that the suspending member can only be assembled with and disassembled from the bar at the notched portions thereof. The end flanges of the bar with the openings therein enable the bar to be assembled with additional bars to provide racks of various configurations which can be suspended from a ceiling in a kitchen or to be fastened to a wall or other vertical surface.

1 Claim, 7 Drawing Figures

SUPPORTING RACK FOR COOKING UTENSILS

This is a continuation of application Ser. No. 719,546, filed Apr. 3, 1985, now abandoned.

This invention relates to a supporting rack for suspending heavy-duty cooking utensils when not in use.

While a number of supporting racks are known for hanging various kitchen utensils, the supporting rack in accordance with the invention has certain advantages over those heretofore known. The new supporting rack includes a bar of predetermined width and length which can be used with additional bars to provide supporting racks of various configurations. The supporting rack also includes a suspending member for hanging the utensils which is assembled with the bar in a manner such that the member and a utensil hanging therefrom cannot be accidentally dislodged from the bar. However, the suspending member can be readily assembled with or removed from the bar with minimal time and effort.

The basic bar of the supporting rack has outwardly-extending flanges at the ends, with the flanges having openings therein for receiving fasteners. The bar also has notches in a lower longitudinal edge thereof near the ends, to enable assembly and removal of the suspending member. The end flanges of the bar with the openings therein enable the bar to be assembled with additional bars of various configurations to provide a variety of racks which can be suspended from a ceiling in a kitchen, or which can be fastened to a wall or other vertical surface.

The suspending member, in a preferred form, is made from a one-piece rod and basically includes a bar-engaging portion, a shank depending therefrom, and a hook curving outwardly at a lower end of the shank. The bar-engaging portion includes a straight web of a length exceeding the width of the bar. A structurally-integral end lip extends outwardly from an upper end of the web and back toward the web. A second, structurally-integral connecting lip is located at a lower end of the web and extends outwardly in the same direction as the upper, end lip and back toward the web. The shank of the suspending member is structurally integral with an outer end of the connecting lip and extends downwardly, substantially parallel to the web. The hook is structurally integral with the lower end of the shank and curves outwardly and upwardly therefrom. The two lips and the hook lie in a common plane with the hook also preferably extending outwardly beyond a vertical line through the web.

For the bar, the minimum distance between the inner end of each of the notches and the opposite longitudinal edge of the bar is less than the minimum distance between the juncture of the upper end lip and the web and the outer end of the connecting lip at the juncture with the shank. This enables the suspending members to be assembled with and dissambled from the bar only at the notches in the bar.

A second shank and a second hook can be employed with the suspending member. For this purpose, the second shank can be affixed to the first shank in parallel relationship by weld metal or the like and the second hook can extend in a direction opposite that of the first hook, with the two lying in a common plane.

It is, therefore, a principal object of the invention to provide an improved supporting rack for heavy cooking utensils having the objects and advantages discussed above.

Many other objects and advantages of the invention will be apparent from the following detailed description of preferred embodiments thereof, reference being made to the accompanying drawings, in which.

Figure 1:
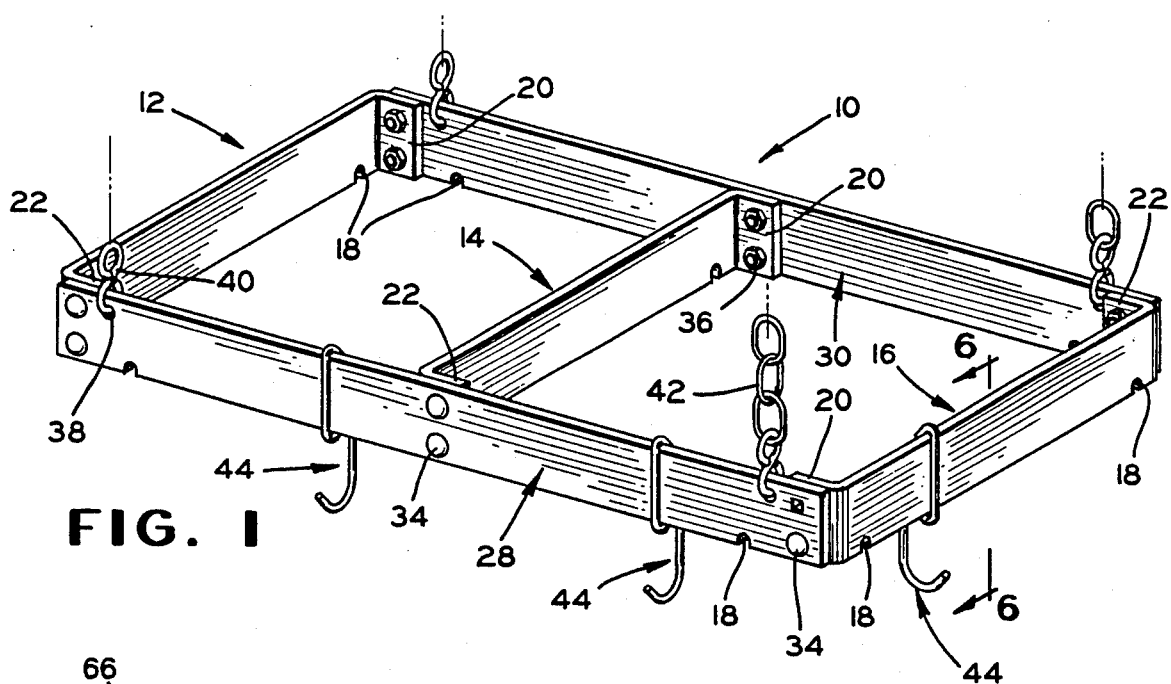
FIG. 1 is a view in perspective of a cooking utensil supporting rack in accordance with the invention, with parts broken away.

Referring to the drawings, and more particularly to FIG. 1, a supporting rack for a plurality of cooking utensils is indicated at 10. The rack 10 includes three supporting bars 12, 14 and 16 of predetermined width and length and of rectangular shape in transverse cross section. Each of the bars has a notch 18 in a longitudinal edge thereof, preferably near each end of the bar. Each of the bars also has outwardly-extending flanges 20 and 22 positioned substantially perpendicular to the main plane of the bar and being structurally integral with the ends of the bar. Each of the flanges 20 and 22 has two openings 24 and 26 therein (FIG. 6) which are of square configuration in this instance and are located on a line perpendicular to upper and lower edges of the flanges.

Straight supporting bars 28 and 30 also constitute part of the supporting rack 10. The bars 12–16, 28 and 30 preferably have a width of two inches and a thickness of three-sixteenth inch. The bars 28 and 30 have end and intermediate square openings 32 which receive shoulder bolts 34 fastened by nuts 36 to attach the bars 12, 14, and 16 to the straight bars 28 and 30. The bars 28 and 30 also have the notches 18 at end portions thereof and additional holes 38 at upper end portions thereof to enable the rack 10 to be suspended from an overhead support, ceiling, or the like. The suspension can be accomplished by S hooks 40 connected to the straight bars 28 and 30 through the holes 38, with the S hooks, in turn, connected to chains 42.

A plurality of suspending members 44 can be assembled wtih some or all of the bars 14–16 and 28, 30 to suspend cooking utensils from the supporting rack 10. The members 44 can be assembled with either side of the bars to provide further versatility and adaptability for the supporting racks. Each of the suspending members 44 basically includes a bar-engaging portion 46, a shank 48, and a hook 50. The suspending member 44 is made of one-piece metal material, preferably a rod having a diameter in the order of one-quarter inch. The bar-engaging portion 46 has a straight web 52 of a length exceeding the width of the bar with which it is assembled. The web 52 has a structurally-integral upper end lip 54 which extends outwardly from the web 52 and back toward the web. A structurally-integral connecting lip 56 is located at the other, lower end of the web 52 and also extends outwardly, in the same direction as the end lip 54, and back toward the web. The shank 48 is structurally integral with an outer end of the connecting lip 56 and extends downwardly from the lip 56 in a direction substantially parallel to the web 52. The hook 50 is structurally integral with the lower end of the shank 48 and curves outwardly from the shank in a direction toward the connecting lip 56. The end lip 54, the connecting lip 56, and the hook 50 all lie in a common plane.

Figure 6:
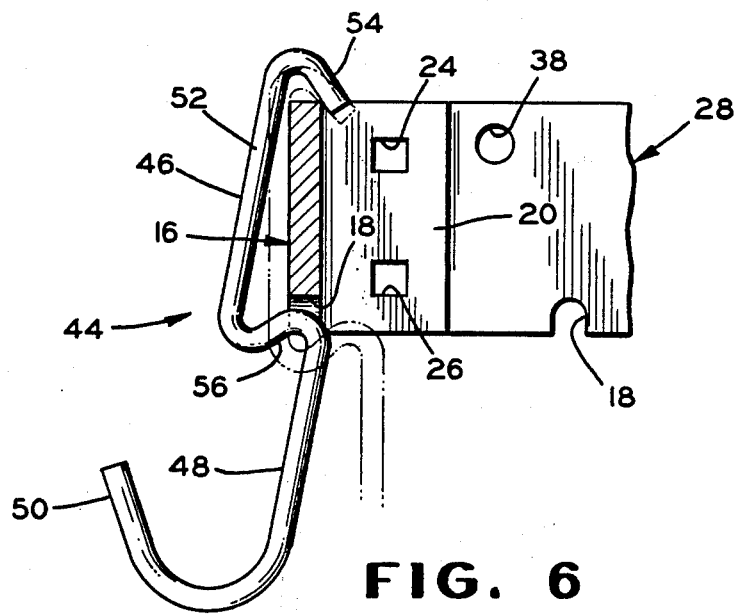
FIG. 6 is a view in section taken along the line 6—6 of FIG. 1.

The minimum distance between the juncture of the end lip 54 and the web 52 and the outer end of the connecting lip 56 at the juncture with the shank 48 is more than the minimal distance between the inner end of each of the notches 18 and the opposite, upper longitudinal edge of the bar with which it is assembled, as illustrated in FIG. 6.

Figure 2:
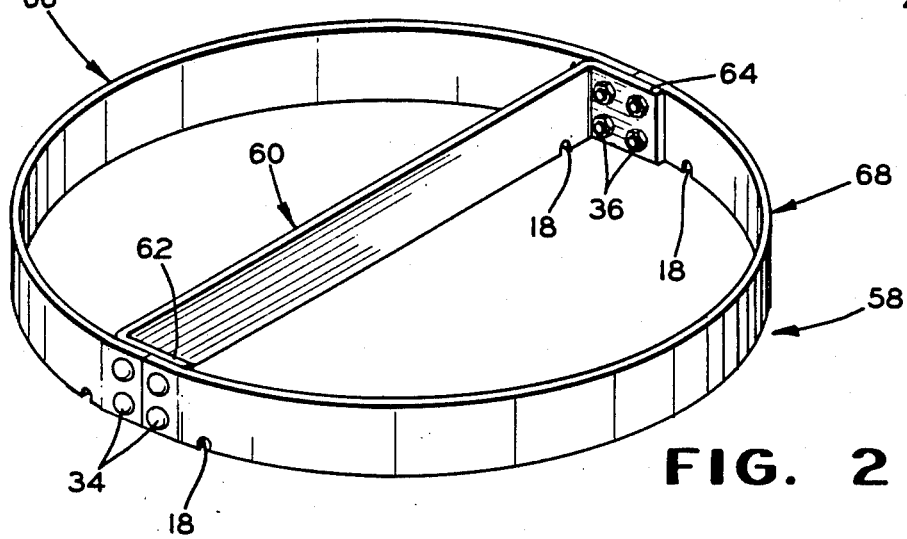
FIG. 2 is a view in perspective of a modified supporting rack.

The basic supporting bars can be used as is or as slightly modified to produce a variety of additional supporting racks. Referring to FIG. 2, a circular supporting rack 58 includes a straight supporting bar 60 which is similar to the bass 14–16 but has wider end flanges 62 and 64. These have two pair of the squared openings 24 and 26 located in lines perpendicular to the edges of the flanges. Two semi-circular supporting bars 66 and 68 have end openings similar to the openings 32 of the bars 28 and 30 and are fastened to the flanges 62 and 64 by the shoulder bolts 34 and the nuts 36. The two semi-circular bars 66 and 68 thereby form a circular rack with the ends of the bars 66 and 68 being in smooth, abutting relationship immediately outside the flanges 62 and 64. The bars 60, 66 and 68 are provided with the notches 18 at their lower edges so that the suspending members 44 can be assembled therewith in the same manner as in FIG. 1. Rather than the two semi-circular bars 66 and 68, a single circular bar can be employed with only two of the shoulder bolts 34 fastening an intermediate portion of the single bar to two openings in the flange 62 or 64.

Figure 3:
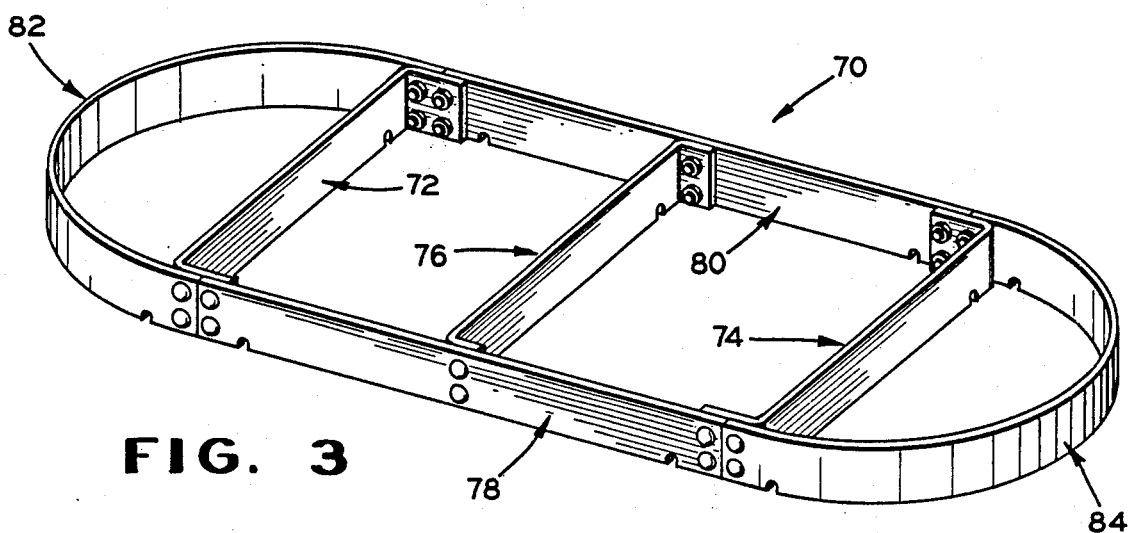
FIG. 3 is a view in perspective of still another modified supporting rack.

A generally rectangular supporting rack 70 with rounded ends in shown in FIG. 3. This includes end bars 72 and 74 similar to the bar 60 and an intermediate bar 76 similar to the bars 12–16. These three bars are connected by straight bars 78 and 80 similar to the bars 28 and 30. Semi-circular end bars 82 and 84 are connected to the flanges of the bars 72 and 74 with their ends abutting the ends of the bars 78 and 80. The bars 82 and 84 are similar to the semi-circular bars 66 and 68.

Figure 4:
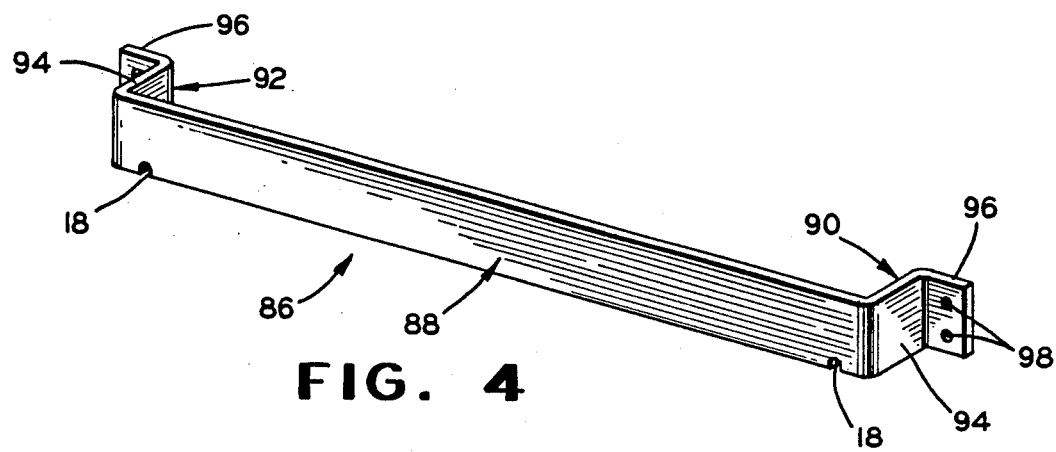
FIG. 4 is a view in perspective of yet another modified supporting rack.
Figure 5:
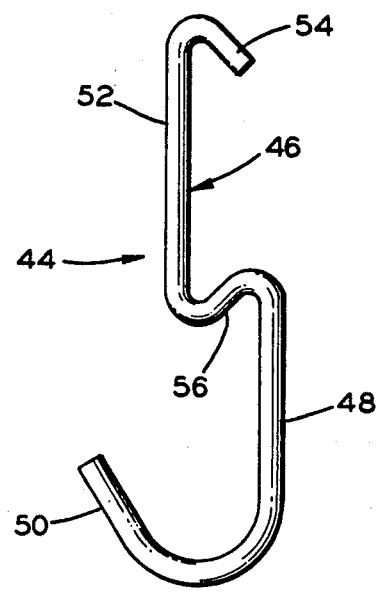
FIG. 5 is an enlarged view in elevation of a suspending member used with a bar of various configurations constituting part of the supporting rack.

Referring to FIG. 4, a supporting rack 86 designed to be fastened to a wall or other vertical surface includes a single straight bar 88. The bar 88 has end flanges 90 and 92, each of which includes an inner portion 94 extending rearwardly from the bar and an outer portion 96. The latter is structurally integral with the inner portion 94 and extends outwardly therefrom, the two portions 96 lying in a common plane parallel to the bar. The outer portions 96 have fastener receiving openings 98 therein to receive fasteners for affixing the rack 86 to a wall or other vertical supporting surface.

Figure 7:
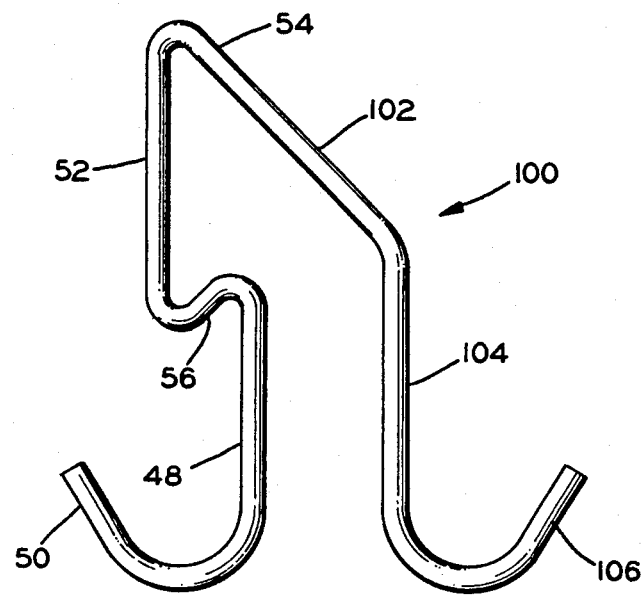
FIG. 7 is a view in elevation similar to FIG. 5 of a modified suspending member.

A modified suspending member 100 is shown in FIG. 7. The member 100 is similar to the member 44 but has a connecting link 102 extending from the lip 54 with an additional shank 104 structurally integral with the link 102. The lower end of the shank 104 has a structurally-integral hook 106 extending outwardly in a direction opposite to the hook 50 but lying in the same plane.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. A supporting rack for a plurality of cooking utensils comprising a bar of predetermined thickness, width and length, said bar having a notch in a lower longitudinal edge thereof near an end of said bar, a rigid suspending member supported by said bar for longitudinal movement therealong, said member being of a one-piece rod having a bar-engaging portion, a straight shank, and a hook, said bar-engaging portion comprising a straight web of a length exceeding the width of said bar, a structurally-integral end lip at one end of said web, extending outwardly from said web and back toward said web, a structurally-integral connecting lip at the other end of said web, extending outwardly therefrom in the same general direction as said end lip and back toward said web, said shank being structurally integral with an outer end of said connecting lip, extending away from said end lip, extending below said bar, and being substantially parallel to said web, said hook curving outwardly from said shank in a direction toward said connecting lip and being structurally integral with said shank, and said end lip, said connecting lip, and said hook being in a common plane, the minimum distance between the inner end of said notch and the opposite longitudinal edge of said bar being less than the minimum distance between the juncture of said end lip and said web and the outer end of said connecting lip at the juncture with said shank, said suspending member further comprising a second straight shank extending below said bar and being positioned in parallel relationship to and spaced from said first straight shank, said straight shanks being spaced apart a distance substantially exceeding the thickness of said bar to enable said bar-engaging portion to be turned and engaged with said bar, a second hook curving outwardly from said second shank in a direction away from said connecting lip and being structurally integral with said second shank, a straight connecting link having one end structurally integral with an upper end of said second shank and having another end structurally integral with an end of said end lip, said connecting link extending diagonally downwardly in the same direction as said end lip and maintaining said straight shanks in their spaced, parallel positions, said second hook, said connecting link, and said first hook being in a common plane.

* * * * *